Aug. 22, 1933.  F. D. CHAPMAN  1,923,421
PROCESS OF HEAT TREATING SUBSTANCES
Filed Jan. 19, 1931  2 Sheets-Sheet 2

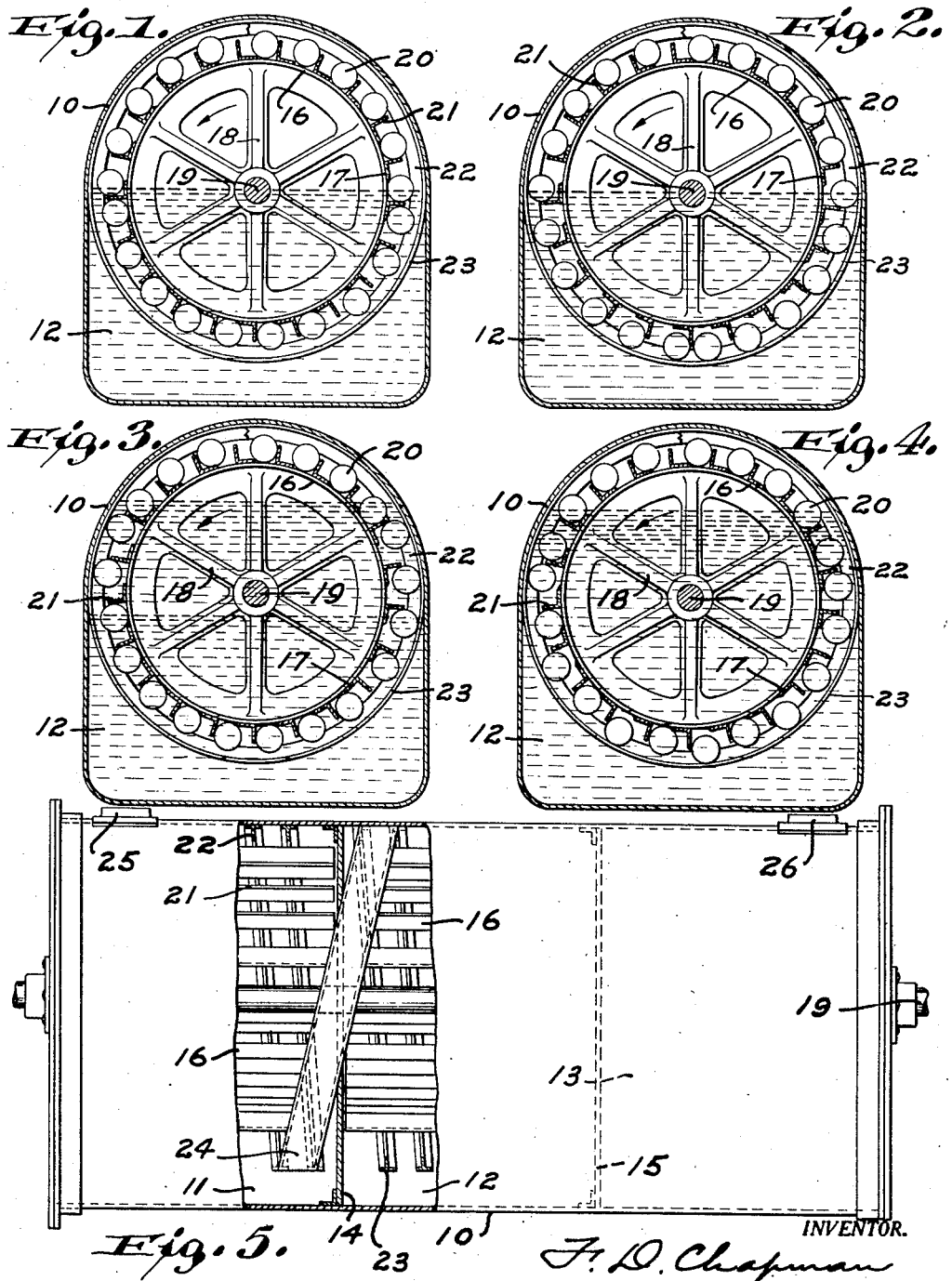

INVENTOR.
F. D. Chapman
BY
Morsell & Morsell
ATTORNEY.

Patented Aug. 22, 1933

1,923,421

UNITED STATES PATENT OFFICE 1,923,421

PROCESS OF HEAT TREATING SUBSTANCES

Frank D. Chapman, Berlin, Wis.

Application January 19, 1931. Serial No. 509,735

5 Claims. (Cl. 99—8)

The present invention relates in general to improvements in the art of heating or otherwise treating various kinds of material, and relates more specifically to an improved process of and apparatus for heat treating food products or the like, especially after batches thereof have been placed in receptacles such as tin cans.

Generally stated, an object of the invention is to provide an improved method of effectively heat treating various kinds of edible substances, and to further provide simple and efficient apparatus for carrying on commercial exploitation of the improved process.

The art of cooking, sterilizing and otherwise heat treating edible commodities after batches thereof have been hermetically sealed in containers such as cylindrical tin cans or glass jars, has heretofore presented many perplexing problems due to the varying characteristics of different materials, and even of the same classes of material under different conditions of growth, production, age and treatment thereof. The products are usually subjected to such treatments in order to place the same in palatable condition and to kill objectionable bacteria, and the processing operation must ordinarily be accomplished both quickly and effectively. The product treated should not be detrimentally affected by the treatment and should therefore be maintained in its natural condition as to color, taste and otherwise, throughout the treating operation and thereafter. In order to avoid deterioration of the product due to sudden overheating, heating for a prolonged period of time, and for other reasons, it is desirable to apply the heat in the most efficient manner possible dependent upon the characteristics of the particular material being treated, and in order to accomplish this result it is sometimes necessary to agitate the batches of material either during the entire treating operation or during predetermined periods thereof.

Prior to the present invention, it was proposed to heat treat certain delicate liquid foods such as milk, after batches thereof had been packed in cylindrical tin cans, by first subjecting the successive food laden cans to initial heating so as to bring the temperature of the material up to a desired point, by subsequently additionally heating the canned product under pressure to effect sterilization, and by finally cooling the heat treated batches in a special cooler. With this prior process, a relatively long initial heating or "bringing up" time was required in order to prevent destructive acton upon the product and upon the cans, and this long bringing up period resulted in deterioration of the milk. The heating medium utilized under this prior process was pure water with a specific gravity and a specific heat of unity, and with a boiling point of 212 degrees F., thus making it necessary to employ a long bringing up period and also making it essential to finally heat treat the batches under pressure. While it was customary with this prior process to agitate the cans during certain portions of the heat treatment, it was impossible to vary the degree of agitation in accordance with the requirements.

It has been discovered that if delicate food products such as milk, are submerged in a liquid having relatively low specific heat and a high boiling point, the bringing up time may be materially reduced without detrimentally affecting the product. If the specific gravity of the heating liquid is properly controlled, the food laden cans will either tend to float or sink depending upon the relationship between the specific gravity of the submerging liquid and that of the packed cans. Some liquids are found to have the characteristic of being soluble with water to provide any desired specific heat and relatively high boiling point whereby the bringing up time may be desirably reduced, and of also providing a specific gravity such that the cans submerged in the liquid may be desirably agitated during predetermined portions of the heat treating operation. These heat treating liquids may be utilized in connection with an ordinary can transporting rotor such as is now customarily used in cooking and sterilizing operations, and the rate of heat transfer may be accurately controlled by the cooperative effect of a proper specific heat and of agitation during proper periods.

In view of the foregoing discovery, it is a more specific object of the present invention to provide a highly flexible process of controlling the heat penetration during the sterilization of batches of food packed in cylindrical containers, by varying both the specific heat of the treating medium and the degree of agitation of the product during transportation thereof through the heating medium.

Another specific object of the invention is to provide simple and efficient apparatus for effecting commercial exploitation of the improved process with minimum loss of treating medium. The novel features of heat treating apparatus shown and described but not specifically claimed herein, form the subject of copending application Serial No. 559,002, filed August 24th, 1931.

A clear conception of the procedure involved in carrying on the improved method, and of one form of apparatus for effecting commercial exploitation of the improved process, may be had by referring to the drawings accompanying and forming part of this specification in which like reference characters designate the same or similar parts in the several views:

Fig. 1 is a transverse vertical section through a machine for heat treating edible substances packed in cylindrical tin cans, showing the action of the cans when the machine is supplied to approximately the level of the central horizontal axis of the transporting rotor, with a heating liquid having a definite specific gravity;

Fig. 2 is a transverse vertical section through the machine, illustrating the action of the cans when the machine is supplied to approximately the horizontal central axis of the rotor with a heating liquid having a different specific gravity;

Fig. 3 is a transverse vertical section through the machine, showing the action of the cans when the machine is supplied to a level considerably above the can transporting rotor axis with a mixture of heating liquid having a specific gravity the same as in Fig. 1;

Fig. 4 is a transverse vertical section through the machine, illustrating the action of the cans when the machine is supplied to approximately the same level as in Fig. 3, with a heating liquid having a specific gravity substantially equal to that of the food laden cans;

Fig. 5 is a somewhat diagrammatic part sectional side elevation of the machine with a portion of the main casing broken away in order to show internal structure.

Figure 6:
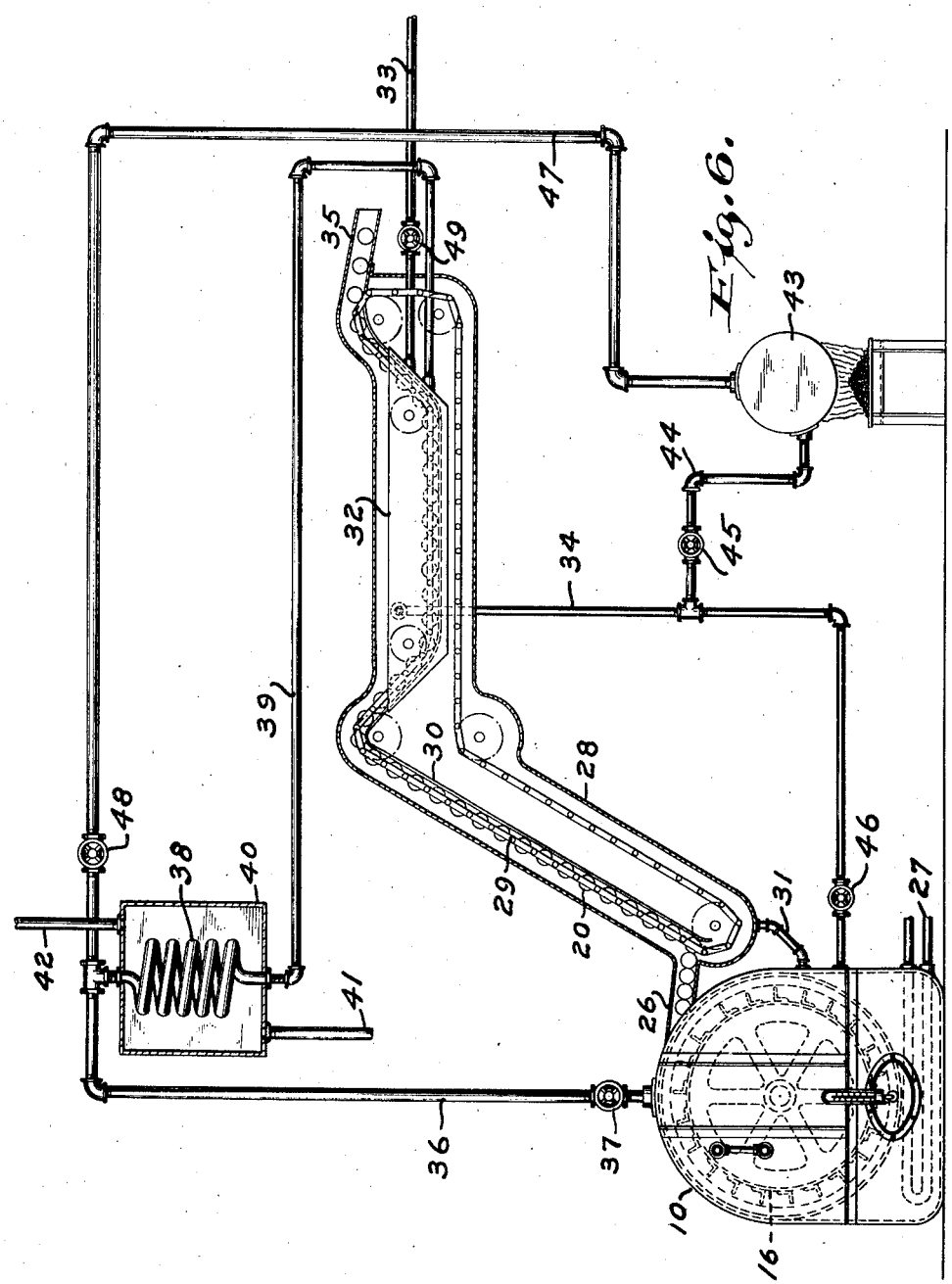
Fig. 6 is a diagrammatic layout of an improved heat treating plant especially adapted for the exploitation of the improved method.

While the improved process will be described herein in connection with a specific type of apparatus, it should be understood that it is not contemplated to limit the scope of the process claims by such specific disclosure, since the improved method is obviously capable of more general exploitation with other forms and types of machines.

Referring to sheet one of the drawings, the sterilizing and cooking machine specifically illustrated therein is of well known construction, comprising in general an elongated main casing 10 the interior of which is divided into three successive chambers 11, 12, 13 by means of partitions 14, 15; and a can conveying rotor having successive sections 16 rotatable within the chambers 11, 12, 13 about a common horizontal axis. Each of the rotor sections 16 consists of an annular series of parallel angle bars 17 secured to the periphery of a supporting spider 18, and the several spiders 18 are rotatably mounted upon a common horizontal shaft 19. The successive angle bars 17 are spaced apart laterally a sufficient distance to permit disposition of the cylindrical cans 20 therebetween, and the outer edges of the bar flanges 21 are movable in close proximity to the inner edges of the flanges 22 forming part of the stationary spiral T-shaped guideways 23 which are secured within the main casing 10. The outwardly extending flanges 21 serve to propel the successive cans 20 around the axis of the shaft 19 during rotation of the transporting rotor, and the inwardly projecting spiral flanges 22 coact with the ends of the revolving can 20 to gradually shift the same longitudinally of the rotor axis. It will be apparent that if the specific gravity of the submerging liquid through which the rotor is adapted to transport the cans, is such that the cans will float into contact with the portion of the rotor beneath the horizontal central plane thereof, the cans 20 will not roll upon the guideways 23 during transportation beneath this plane. If the specific gravity of the liquid is such that the cans 20 sink therein, the cans will be rolled along the guideways 23 throughout the major portion of the submergence. The casing 10 is moreover provided with stationary transfer chutes 24 disposed adjacent to the partitions 14, 15 and these chutes are adapted to transfer the cans in succession from one rotor section 16 to the next, without necessarily producing mixing of the heating liquids confined within the successive chambers 11, 12, 13. One end of the main casing 10 is further provided with a can inlet 25, and the opposite end of the casing is provided with a can outlet 26, both of which are of well known construction.

Each of the successive chambers 11, 12, 13 may be provided with a submerging basin of heating liquid and the liquids in the several chambers may be of the same or of different characteristics, and may be disposed either at the same or different levels in the successive basins. The liquids in the successive chambers may be heated to any desired temperature by means of steam coils 27 or otherwise, and one or more of these basins may contain cooling liquid instead of heating liquid. In accordance with the present invention, the treating liquid in the chambers 11, 12, 13 is preferably a solution consisting of predetermined proportions of water and another liquid having relatively low specific heat, a high boiling point, and a high specific gravity. The treating liquid must moreover be non-poisonous when utilized for the treatment of foods, and should also be non-odorous since certain foods have the characteristic of absorbing objectionable odors. When tin cans are employed as containers for the batches of substance being treated, the submerging liquid must not detrimentally affect the metal of the cans as by electrolysis, and if several basic liquids are employed these must not be immiscible to one another.

It has been found that glycerine or glycerol, $C_3H_5(OH)_3$, which in fact is also a food, is well suited as a basic liquid since it has relatively low specific heat (.54), a high boiling point, and relatively high specific gravity (1.25). Another suitable liquid is ethylene glycol, $C_2H_4(OH)_2$, which likewise has low specific heat (.52), a high boiling point, and relatively high specific gravity (1.118). The specific heat of these two basic liquids is approximately the same, but the boiling point of glycerine is considerably higher than that of ethylene glycol. The specific gravity of packages such as milk filled tin cans, is approximately 1.114, while that of water is unity. The basic liquids mentioned are freely soluble in water and in each other, and it will therefore be apparent that any desired specific heat, boiling point, and specific gravity of the mixture may be obtained by merely mixing suitable proportions of the several ingredients. By utilizing all three of these liquids, the specific gravity of the mixture may be made such that the food laden cans will either sink or float in the mixture, or the specific gravity of the food laden cans and of the heating medium may be equalized. The solution may be readily segregated into its constituents, by distillation, thus permitting remixing of the basic liquids and water in order to secure a submerging and heating solution having any desired characteristics within the limits of the characteristics of the constituents.

Now assuming that it is desired to sterilize a substance requiring little or no agitation during the treatment thereof, the heating solution will be so mixed that the density or specific gravity thereof is higher than that of the food laden cans 20, as shown in Fig. 1, thus causing the cans 20 to float into intimate contact with the transporting rotor during the entire submergence in the liquid, the level of which is maintained at the central axis of the shaft 19. The only agitation which the cans 20 then receive, is that due to the revolution of the cans about the rotor axis, and there will be no agitation of the product due to rotation of the cans about their own individual axes.

If the density of the heating liquid is reduced below that of the food laden cans 20 as indicated in Fig. 2, and the level of the liquid is maintained at the central horizontal axis of the transporting rotor, then the cans will sink into engagement with the spiral guideways 23 during the entire submerging period and the cans will be doubly agitated due to revolution about the rotor axis and due to rotation of the cans about their own axes by virtue of their rolling along the guideways 23. The cans 20 will not, however, be rotated about their own axes during passage therethrough the space above the heating liquid so that there will be no violent agitation of the can contents during such periods.

If the specific gravity or density of the treating liquid is increased so as to float the cans 20, and the level of the heating liquid is raised as indicated in Fig. 3, then the food laden cans will be brought into contact with the guideways 23 during a portion only of the submergence. As indicated in Fig. 3, the cans upon entering the submerging basin will be rotated about their own axes until they pass below the central horizontal plane of the rotor axis, whereupon the agitation due to rotation about their own axes will cease until the cans are again carried above said plane. When the cans are leaving the treating liquid they will again be agitated by rotation about their own axes until they actually leave the heating basin whereupon the only agitation will be due to revolution of the cans about the rotor axis.

In Fig. 4 is depicted the action of the food laden cans 20 if the specific gravity of the heating liquid and of the cans is equalized. In this case, the cans may or may not be agitated during submergence thereof, but are not agitated due to rotation about their own axes, while being transported above the heating basin.

Now assuming that it is desired to sterilize a substance having the characteristics of milk, the solution of the heating liquid must be such that the liquid can be heated to a temperature sufficiently high for sterilization without transforming the basic liquid into vapor. The specific heat of the mixture must also be such that the heat transfer will be gradual to avoid detrimental action upon the substance. Then, as the successive cans 20 are submerged in the heating liquid having relatively low specific heat but high temperature the batches of food are gradually but quickly subjected to the sterilization temperature and the low specific heat of the heating medium acts to retard the heat transfer sufficiently to prevent scorching, carmelization or other detrimental action which might result from sudden application of high temperatures. The product is simultaneously agitated during desirable periods thereby further augmenting the heat penetration, and the various characteristics of the treating medium may be readily controlled by merely varying the proportions of ingredients in the heating liquid.

Since the basic liquids specifically referred to herein are relatively costly as compared to water, and in view of the fact that the successive cans leaving the treating chamber tend to carry away considerable of the liquid, it is desirable to reclaim or recover the escaping liquid. For this purpose, apparatus such as illustrated in Fig. 6 of sheet two of the drawings may be provided. In this apparatus the main casing 10 of the heating device, has its outlet 26 communicating directly with an auxiliary casing 28 within which is disposed an endless can conveyor 29. The initial inclined can receiving portion of the conveyor 29 cooperates with a stationary sloping plate 30 to advance the successive heat treated cans 20 upwardly along the plate 30 thereby permitting drainage of the greater portion of the heating liquid back into the main casing through a return pipe 31. The conveyor 29 is adapted to subsequently transport the cans 20 through a washing basin 32 supplied with fresh washing water either from a condenser or from a fresh water supply line 33, or from both of these sources. The successive cans 20 during their passage through the washing basin 32 are thoroughly washed for the removal of adhering basic liquid and the solution resulting from this washing may be returned directly to the main casing 10 through an overflow pipe 34. The auxiliary casing 28 may also be provided with a can discharge 35 through which the finally treated and cleansed cans are discharged.

The space within the upper portion of the main casing 10 may be provided with a vapor outlet pipe 36 having a shut-off valve 37 therein, and this pipe 36 communicates with a condenser coil 38 which in turn communicates with a pipe 39 leading into the end of the washing basin 32. The condenser coil 38 is disposed within a housing 40 to which cooling fluid may be admitted through a pipe 41, and from which the heated cooling medium may be delivered through a pipe 42. A still 43 may also be utilized for the purpose of recovering the basic liquid deposited in the washer 32. The still 43 has a connection 44 provided with a shut-off valve 45 and communicating with the overflow pipe 34. A shut-off valve 46 may also be provided in the overflow pipe 34 beyond the still connection, in order to cause the overflow liquid delivered from the basin 32 to pass through the connection 44 to the still, and the still 43 is moreover provided with a vapor discharge pipe 47 communicating with the condenser coil 38 when the control valve 48 thereof is open. The vapor condensed by the coil 38 results in substantially pure water which is passed into the washer 32, and the fresh water supply line 33 may be provided with a regulating valve 49 for controlling the admission of fresh water to the system, as needed.

During normal operation of this apparatus for the recovery of basic liquids removed from the main casing 10 by the cans 20, the cans are transported by the conveyor 29 along the inclined plate 30 and most of the liquid is drained from the cans and is returned to the casing 10 through the connection 31. The remainder of the adhering liquid is washed off of the cans in the washer 32 and the washed cans are delivered from the discharge 35. When the still 43 is not in use, the valves 45, 48 are closed and the valves 37, 46 are open. The valve 49 may be open slightly, if fresh water is necessary. The vapors created above the surface of the treating liquids in the casing 10 by boiling off of some of the water, pass through the pipe 36 to the condenser coil 38 where they are condensed, and the water of condensation is returned to the washer 32 through the pipe 39. The overflow from the washer 32 is returned through the pipe 34 to the casing 10, thereby completing the circuit. If the proportions of mixture in the treating basins is not proper for the material to be treated, then some of the basic liquid may be removed from the system with the aid of the still 43, in an obvious manner, thus permitting attainment of any desired characteristics of the treating liquid.

From the foregoing description it will be apparent that the improved process and apparatus provide a relatively flexible system for treating various species of material, by merely varying the proportions of the basic liquid and water in the heating solution to suit the specific characteristics of the substance to be treated. The rate of heat penetration or transfer may be readily varied at will, by merely varying the specific heat of the solution and the degree of agitation. The degree of agitation may be readily varied, by varying the density or specific gravity of the solution, and the chambers 11, 12, 13 may be either completely or only partially filled with the heating liquid. When only partially filled, the intermittent removal of the food laden cans from the heating basins has an improved effect on some products which are advantageously treated by alternate heating and cooling. The partitions within the casing 10 may also be removed thereby providing a single treating chamber, and the use of a heating medium having a high boiling point obviously eliminates necessity of treating the product under pressure. When it becomes desirable to change the proportions of the basic liquid and water contained in the heating medium, this change may be readily effected by distillation, thus making it possible to secure any desired results without loss of basic liquids.

The novel feature of heat treatment of food products by submerging the same in heating solution having predetermined specific heat, forms the subject of Patent #1,901,083, granted March 14, 1933, and this is also true with respect to the feature of controlling the degree of agitation by varying the density of the treating liquid, which forms the subject of Patent #1,901,084, granted March 14, 1933. The present application is intended to protect only the new and useful results obtainable by the combination of these other processes.

It should be understood that it is not desired to limit the present invention to the use of the basic liquids herein specifically referred to and to the details of the apparatus herein shown and described, for various modifications within the scope of the claims may occur to persons skilled in the art.

It is claimed and desired to secure by Letters Patent:

1. The process of heat treating edible substance, which comprises, transporting successive hermetically sealed batches of the substance through a liquid having a predetermined density and a lower specific heat than that of pure water, utilizing said density to control the degree of agitation of the batches during said transportation, and utilizing said specific heat to control the rate of heat transfer.

2. The process of heat treating edible substance, which comprises, transporting successive hermetically sealed batches of the substance through a heated liquid having a predetermined density and a lower specific heat than that of pure water, varying the depth of submergence and utilizing the said density to control the degree of agitation of the batches during said transportion, and simultaneously utilizing said specific heat to control the rate of heat transfer.

3. The process of heat treating edible substance, which comprises, transporting batches of the substance through a heated solution of glycerol and ethylene glycol, utilizing the specific gravity of said solution to control the degree of agitation of the batches during said transportation, and simultaneously utilizing the specific heat of said solution to control the rate of heat transfer.

4. The process of heat treating edible substance, which comprises, transporting batches of the substance concealed in metallic containers through a non-electrolytic heated liquid having a predetermined density and a lower specific heat than pure water, utilizing the non-electrolytic property of the liquid to avoid deterioration of the containers, utilizing the density of the liquid to control the degree of agitation of the batches, and utilizing the specific heat of the liquid to control the rate of heat transfer.

5. The process of heat treating edible substance, which comprises, transporting batches of the substance packed in cylindrical containers through a heated liquid having a specific gravity above and a specific heat below that of pure water, utilizing said specific gravity to control the degree of rolling of said containers and consequent agitation of the batches during said transportation, and simultaneously utilizing said specific heat to control the rate of heat transfer.

FRANK D. CHAPMAN.